United States Patent [19]

McEwen

[11] Patent Number: 4,952,809
[45] Date of Patent: Aug. 28, 1990

[54] IMAGING SYSTEM

[75] Inventor: Robert K. McEwen, Billericay, United Kingdom

[73] Assignee: GEC-Marconi Limited, Stanmore, United Kingdom

[21] Appl. No.: 215,507

[22] Filed: Jul. 6, 1988

[30] Foreign Application Priority Data

Jul. 8, 1987 [GB] United Kingdom ............... 8716037

[51] Int. Cl.$^5$ .................... G01J 1/20; H01L 25/00
[52] U.S. Cl. ................................ 250/342; 250/334; 250/332; 250/203.1; 250/206.1; 358/113; 358/213.24
[58] Field of Search ............... 250/203 CT, 332, 334, 250/342; 358/113, 213.24

[56] References Cited

U.S. PATENT DOCUMENTS

| | | | |
|---|---|---|---|
| 3,723,642 | 3/1973 | Laakmann | 250/332 |
| 3,804,976 | 4/1974 | Gard | 250/334 |
| 3,833,762 | 9/1974 | Gudmundsew . | |
| 3,946,155 | 3/1976 | Houston | 250/332 |
| 3,995,159 | 11/1976 | Elliott | 250/334 |
| 4,278,999 | 7/1981 | Ganguly et al. . | |
| 4,362,938 | 12/1982 | Bosserman | 250/332 |
| 4,477,834 | 10/1984 | Beaumont et al. | 250/332 |
| 4,675,532 | 6/1987 | Carson | 250/332 |
| 4,757,200 | 7/1988 | Shepherd | 250/332 |

FOREIGN PATENT DOCUMENTS

| | | |
|---|---|---|
| 0066020 | 12/1982 | European Pat. Off. . |
| 0082406 | 6/1983 | European Pat. Off. . |
| WO8703138 | 5/1987 | PCT Int'l Appl. . |
| 1523192 | 8/1978 | United Kingdom . |
| 2188508 | 9/1987 | United Kingdom . |

Primary Examiner—Stephen C. Buczinski
Attorney, Agent, or Firm—Spencer & Frank

[57] ABSTRACT

An infra-red imaging system is operable selectively in wide and narrow field of view modes. Radiation from the object is imaged onto an infra-red CCD staring focal plane array (SFPA) which provides an output representing the image. In the narrow field of view mode, operative on detection of a particular target by target detection electronics, the image is not scanned but is made to follow any movement of the target, and the SFPA stares at the target to build up an image. In the wide field of view mode, the same SFPA is used to provide the image, but the image is scanned along a swath. Smearing of the image is minimized by driving the IRCCD array such that the image-bearing charge is passed down the array from element to element at a speed equal to the scanning speed, so that the output signal from the end element represents the intensity of radiation from a given portion of the object time-integrated by all the elements of the array in succession.

12 Claims, 3 Drawing Sheets

IMAGING SYSTEM

This invention relates to an imaging system using an array of detectors of the type which store an electrical signal representative of the time-integrated radiation intensity, and is particularly useful as an infra-red imaging system using a "staring focal plane array" (SFPA) of such photodetectors for surveillance and "search and track" (IRST) applications.

Infra-red (IR) imaging systems are becoming increasingly popular and important in many fields now, particularly in military and security applications. These systems offer 24-hour operation and are completely passive, in that they image the IR radiation naturally emitted by terrestrial scenes. Early IR imaging systems employed a relatively small number of detector elements across which was scanned an IR image of the scene using a system of rotating mirrors and/or prisms. Due to the fact that much of the IR energy emitted by any part of the scene was lost whilst the detector elements were being scanned across other areas, such systems were very inefficient in terms of their detection capability. This was partially offset by utilising a greater number of detector elements together with some Time Delay and Integrate (TDI) electronics either off the detector, on the detector substrate, or within the detector elements themselves. An improvement of $\sqrt{N}$ in the signal-to-noise ratio of the image was therefore obtained over a single element detector, where N was the number of elements used to image the scene. Nonetheless, the detector process was still relatively inefficient.

More recently 2-dimensional arrays of detector elements have been utilised in imaging systems where each element is "mapped" onto a specific area of the scene using an IR lens system, in a similar manner to the film in a conventional camera or the retina in the eye. In this way almost all the IR energy emitted by the scene can be received by the detector elements and, because they continually stare at the scene without scanning it, such detectors have been termed "Staring Focal Plane Arrays" (SFPA). The performance of systems employing such detectors is very close to the theoretical limit set by the physical processes of radiation emission.

Unfortunately, the number of elements in such SFPA's is currently limited by fabrication technology to around 128×128 or fewer. In applications requiring wide fields of view (FoV) the spatial resolution of the scene is limited to, say 1/128th of the FoV.

An alternative would be to sacrifice some of the sensitivity of the SFPA and scan it across the scene to build up a wide FoV image from a mosaic of the narrow FoV "tiles" obtained at each stare. This would require the introduction of a complex scanning mechanism into the system which moved the image of the scene across the SFPA in discrete steps. It would be imperative that this mechanism stopped the image motion completely during each stare period to avoid image smearing It would then have to scan the image by exactly a narrow FoV angle in as short a period of time as possible, before commencing the next stare period, to capture the next tile in the mosaic. Such a scan-to-scan mechanism would clearly be very complex, expensive and difficult to maintain. In view of this problem SFPA's have generally not been used for such applications and alternative, less ideal detector array structures have been utilised.

In many applications there is a requirement to change from a wide FoV to a narrow FoV with superior sensitivity. Such an example is in the surveillance field where a wide FoV is required for maximum area coverage, yet when a potential threat or intruder is detected a narrow FoV with higher sensitivity is required for detailed examination purposes. Many other applications exist in such diverse areas as submarine periscopes to aircraft IR Search and Track (IRST) systems. In such cases the normal solution is a dual imager system with a wide FoV imager around which the narrow FoV SFPA "foveal patch" can be steered.

This invention puts forward quite a different solution to both the wide and dual FoV requirements by using the same array of detector elements for both FoV requirements by using elements capable of staring when not scanning, to build up a narrow FoV image, and, for the wide FoV image, scanning the object in a manner which minimises smearing.

The invention provides a method of imaging with selectively a wide or a narrow field of view, using the same two-dimensional array of detector elements for both, each element storing an electrical signal representative of the time-integrated intensity of the light incident on it, wherein, in a wide field of view mode of operation, the array is made to scan swathes of an object along respective columns of the array and periodically the stored electrical signals are shifted simultaneously in the direction of the scan from each element to its neighbour for continued time-integration, the stored electrical signal from the end element of each column of the array being provided as an output signal, the average speed at which the signals progress along the array being equal to the speed of the image scan whereby smearing of the image is minimised, each successive output signal of a column being representative of the intensity of radiation from a different portion of the object time-integrated by all the elements in succession, and wherein, in a narrow field of view mode, the array is held stationary relative to the image, the elements are made to perform a time-integration over a stare period substantially greater than the period between successive simultaneous shifts in the wide field of view mode, and the stored signals are then read out from all the elements.

The two-dimensional array is preferably an SFPA.

Current SFPA's fall into two categories:

(i) Line addressed arrays, where only one line of elements in the two-dimensional array is active at any one time. By addressing each line of detector elements in the array, the image can be built up. Such detectors offer the equivalent performance of a linear array of elements optically scanned across the scene, (ii) Fully staring IR Charged Coupled Devices (IRCCD's) in which each element in the two-dimensional array is directly connected to a charge storage element. During the stare period, electrons generated by the detection of IR radiation at the sensitive element are fed to the storage element. After a period, the sensitive element is effectively switched off, and the stored charge read out in a serial fashion to form the image signal. Such detectors offer virtually fully staring performance.

Although the invention is applicable to the line addressed type of SFPA, much greater sensitivity can be achieved by applying the technique to the IRCCD type. Preferably, the method includes the detection of a particular target when in the wide FoV mode, and the consequent switch to the narrow FoV mode during which the target is tracked by continuous adjustment of the position of the image on the array so that the target image is not lost. A further desirable result of the tracking in this mode is that the image of the target is saved from blurring during the stare period. The tracking of the target is preferably carried out by the same apparatus which causes the scanning movement in the wide FoV mode.

Clearly, the line addressed SFPA can be operated as a single line of detector elements by activating only one of the available lines in the detector array. By scanning an IR image of the scene transversely of the active line, the wide FoV image can be built up in a similar manner to systems using a linear detector array. When the narrow FoV is required, the scanning mechanism is stopped with the target area of the scene imaged onto the detector array. The line addressed detector is then operated in the conventional manner to produce the narrow FoV, higher sensitivity image, i.e. each line in the detector array is activated in turn to produce the image signal directly from the device. Additional sensitivity is obtained because the detector array is now imaging only the narrow FoV, hence the dwell times can be increased, or the overall frame time decreased. In either case, the stare efficiency is increased by a factor given by the product of the horizontal and vertical ratios of the wide to narrow FoV's. The sensitivity is increased by the square root of this factor.

In each case, however, only "line equivalent performance" is possible, that is the sensitivity is $\sqrt{M}$ times better than a single element scanning the FoV, where M is the number of elements in each active line of the detector array. With the IRCCD type of detector array, the situation is better, as in the narrow FoV mode near fully staring performance can readily be achieved.

One way in which the invention may be performed will now be described, by way of example, with reference to the accompanying drawings, of which:

Figure 3:
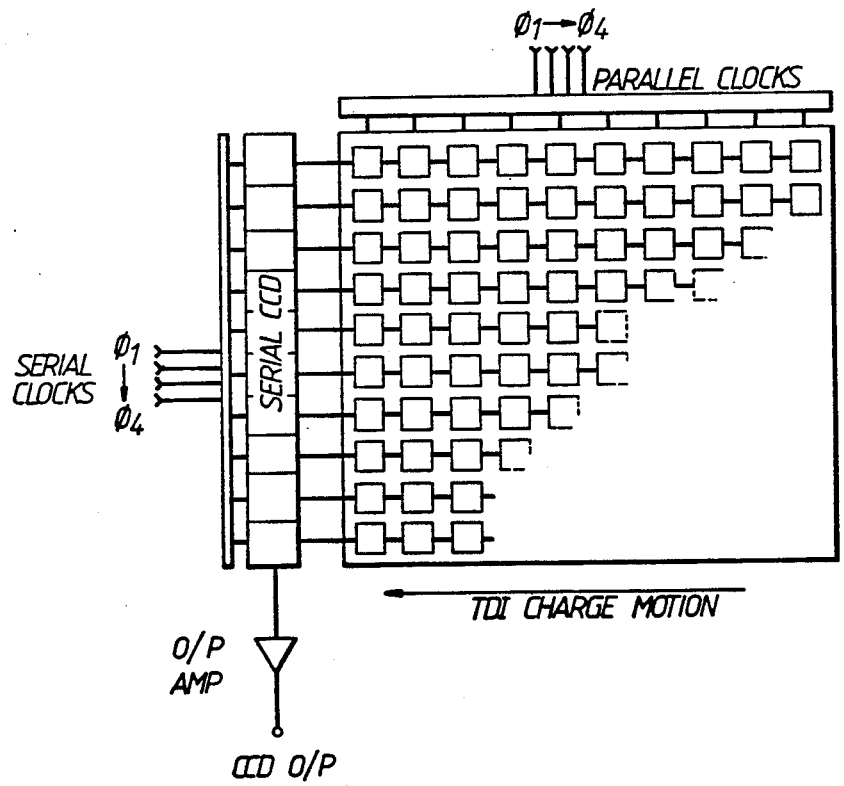
FIG. 3 illustrates a scanned IRCCD and its method of operation using the timing sequences of FIG. 2.
Figure 4:
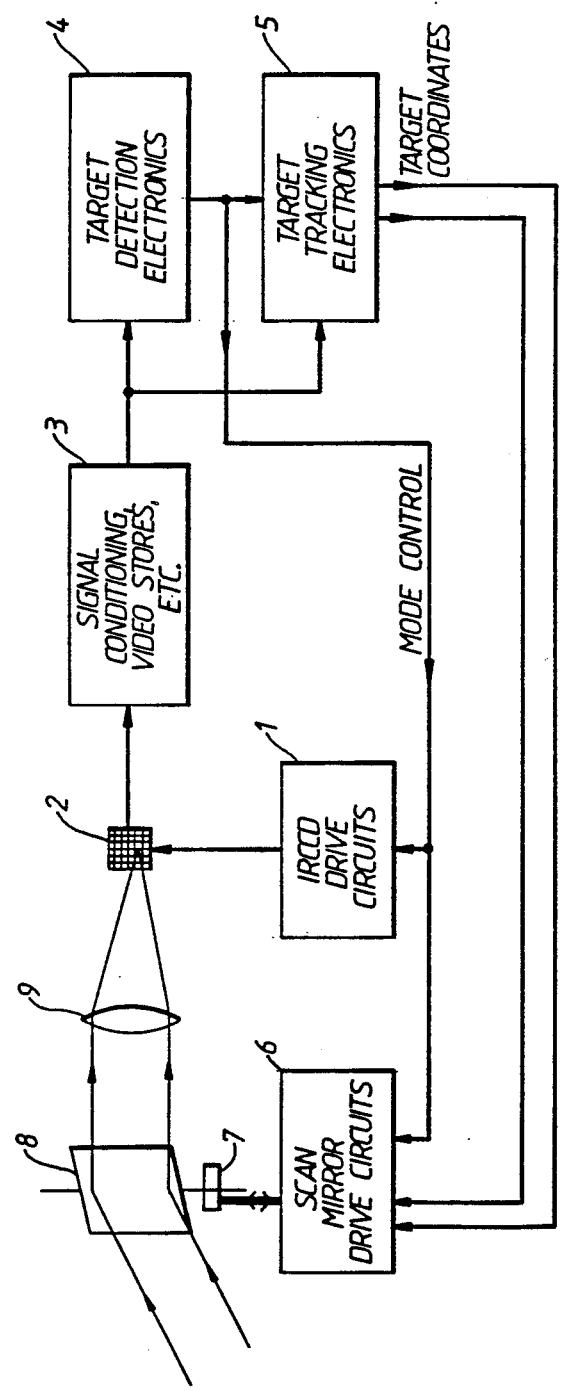
FIG. 4 is a diagram of apparatus embodying the invention and incorporating the IRCCD of FIG. 3.

The detector used in the preferred form of imaging system embodying the invention is a two-dimensional SFPA of the IRCCD type as shown in FIGS. 3 and 4, which has M linear arrays of N photodetectors.

Figure 1:
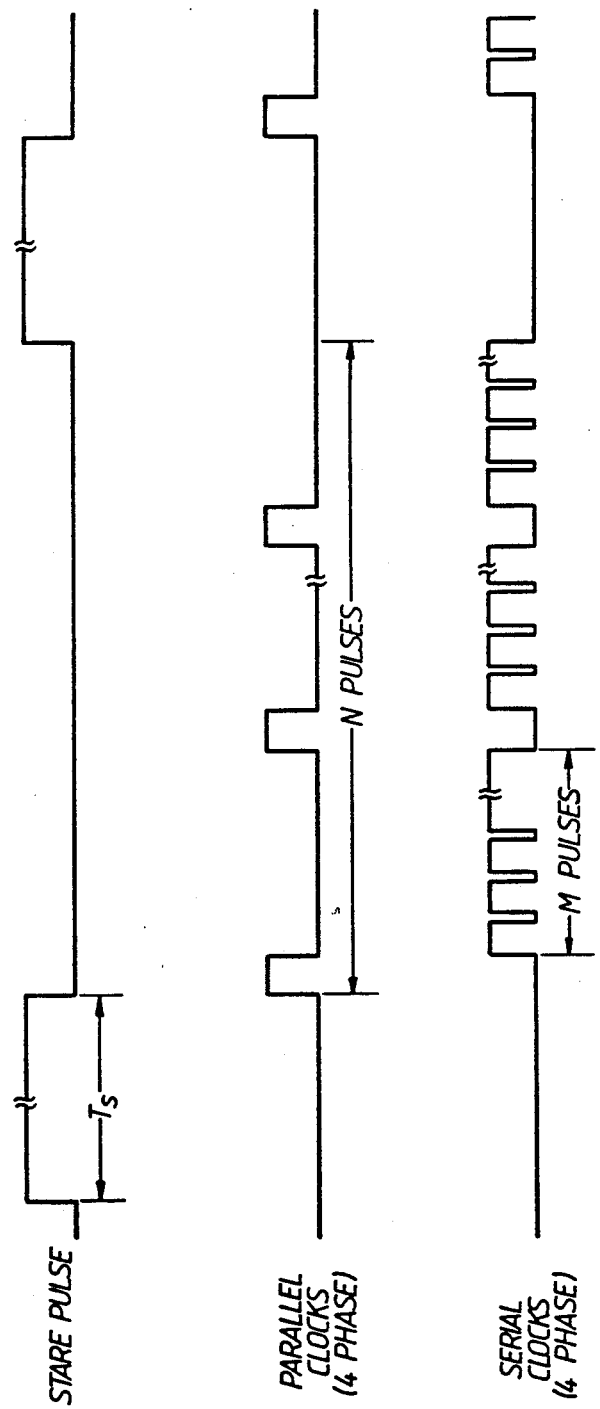
FIG. 1 shows three pulse trains representing the conventional IRCCD timing sequence for an N×M array.

By way of a comparison, the conventional operating sequence with IRCCD detectors is to inject photocurrent into the charge storage wells for a period Ts known as the stare time. This is then followed by a sequence of clocks being applied to the device to transfer the charge to the output of the detector, row by row, column by column, as shown in FIG. 1. First one set of parallel clocks is applied to the entire array to shift the charge along the CCD by one pixel. The charge from the M elements at the edge of the array is transferred to an additional CCD line, known as the serial output CCD (FIG. 4). A sequence of N clocks is then applied to this serial CCD to transfer the signals along it to the output node (CCD O/P). When the charge from all the elements has been transferred out of the serial CCD, another set of parallel clocks is applied to the device. This sequence is repeated until the charge packets from every element have been fed to the serial CCD and then to the output node. Aother stare time is then initiated to refill the charge storage elements with photocurrent and hence capture the next frame.

Clearly with this conventional system the IR image of the scene must be stationary over the entire array during the stare time (to less than ±1 element pitch) to prevent image smearing. With a continuous motion scanning system this restriction would impose a ridiculously low stare efficiency. The solution embodying this invention is to alter the operating sequence of the IRCCD and use it in the form of TDI (time delay and integration) mode.

Figure 2:
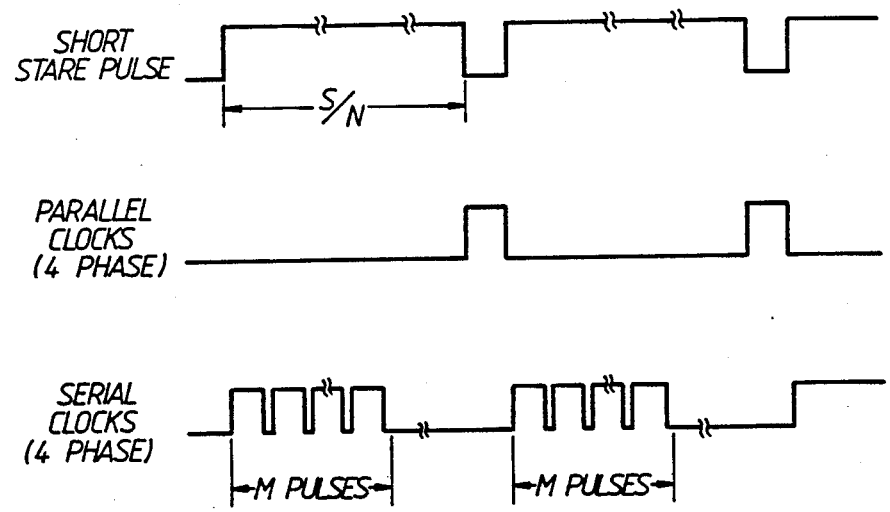
FIG. 2 shows the pulse trains corresponding to those of FIG. 1 appropriate for the modified IRCCD timing sequence adopted in a preferred embodiment of the invention.

As shown in FIG. 2, the stare time at the start of each frame is broken up into N short stare periods, N being the number of elements along the CCD. Each short stare period is 1/Nth of the total stare time, Ts which is kept the same as in the conventional operating mode. Following each of the short stare periods, a single set of parallel clocks is then applied to the entire array, to move the charge in the CCD elements along the CCD by one position. The charge from the row of elements at the end of the CCD is therefore passed on to the serial CCD from where it can be transferred to the output node by the application of the serial clock. While the charge is being transferred through the serial CCD the next short stare initiation clock pulse is applied to the device to inject more photocurrent into the charge storage elements. The sequence is then repeated. The photocharge therefore moves through the CCD elements with a fixed average velocity, and the transferred signal increases with each short stare period linearly to a maximum after N short stare periods. After this, all the charge packets fed to the output node will have been integrated for a total of N short stare periods, equal to the total stare time Ts.

The serial and parallel clocks which drive the IRCCD, in both the conventional manner of FIG. 1 and the novel manner of FIG. 2, provide 4-phase clock signals 01–04 as shown.

If the IR image of the scene is scanned across the CCD at the same fixed velocity as the photocharge then integration will occur with each stare period and no significant image smearing will take place. This operation is shown schematically in FIG. 3. Further, by overlapping the stare periods with the serial clocks, inefficiencies in the detector due to the finite readout time are removed, permitting virtually 100% stare efficiency for each detector frame. Therefore, by using the invention, the sensitivity of the system in the wide FoV mode with an NxM detector is $\sqrt{N \times M}$ better than for a single scanned detector element.

FIG. 4 shows the imaging apparatus incorporating the array of FIG. 3. Image-bearing IR radiation from an object scene is directed by a mirror 8 through a focussing lens 9 onto the IRCCD array 2 at the focal plane of the lens 9. The IRCCD Output (CCD O/P, FIG. 3) is fed to a signal processing unit 3 responsible for signal conditioning, storing of the conditioned signals as video frames, and/or displaying an image built up from the conditioned signals.

The scanning of the IR image of the object scene across the IRCCD array 2 is performed by a mirror drive motor 7 driving the mirror 8, controlled with a servo loop by scan mirror drive circuits 6. The clocking of the IRCCD is performed by IRCCD drive circuits 12. Target detection and tracking circuits (4 and 5) monitor the video output from the IRCCD via the signal processing unit 3, and provide target co-ordinates to the scan mirror drive circuits 6.

Initially, with the system in a wide FoV mode, no targets are detected and the scan mirror drive circuits operate in a preprogrammed scan scanning the IRCCD over a wide FoV in predetermined swathes. In this mode, the IRCCD is operated in the novel TDI mode (FIGS. 2 and 3). Eventually, upon the detection of a potential target in the wide FoV, a mode change signal is supplied on a "mode control" line to the scan mirror drive circuits 6 and the IRCCD drive circuits 1, both of which change to a narrow FoV mode. The target tracking electronics are also activated. In this mode, the system FoV is the narrow instantaneous FoV of the SFPA 2, and the stare efficiency is increased to almost 100%. The target tracking electronics 5 monitor the position of the target in the FoV and supply the co-ordinates of the target to the scan mirror drive circuits enabling them to maintain the target in the centre of the narrow FoV. The IRCCD drive circuits 1 drive the SFPA 2 in the conventional fully staring manner.

A suitable detector for this application is the Mullard 64×64 element 3-5 μm IRCCD. The elements in this detector are arranged in a square format on a 48 μm pitch. With f2 optics, the total stare time for such a detector is around 4 mS, whilst the readout rate may be as high as 4 million pixels per second. This is determined by the serial clock rate. In the narrow FoV mode, therefore, the total frame time is around 5 ms, giving approximately 80% stare efficiency.

In the wide FoV mode, the parallel clock rate is determined by the greater of 1/64th of the total stare time and 64 serial clock periods. In this case, the total time for 64 serial clock periods is around 16 μS, whilst 1/64th of the total stare time is around 62.5 μS. This yields a mean charge packet velocity on the IRCCD of 48 μm/62.5 μS=0.768 m/s. If the focal length of the IR lens is 75 mm then the instantaneous FoV is around 3°, and the scan velocity is therefore approximately 750°/S. Hence, a 360°×3° FoV can be scanned in around half a second, which is perfectly adequate for many situations. Upon detection of a target this FoV may be reduced to 3°×3° with an increase in sensitivity of a factor of $\sqrt{120}=11$.

I claim:

1. A method of imaging with selectively a wide or a narrow field of view, using the same two-dimensional array of detector elements for both, each element storing an electrical signal representative of the time-integrated intensity of the light incident on it, wherein, in a wide field of view mode of operation, the array is made to scan swathes of an object along respective columns of the array and periodically the stored electrical signals are shifted simultaneously in the direction of the scan from each element to its neighbour for continued time-integration, the stored electrical signal from the end element of each column of the array being provided as an output signal, the average speed at which the signals progress along the array being equal to the speed of the image scan whereby smearing of the image is minimised, each successive output signal of a column being representative of the intensity of radiation from a different portion of the object time-integrated by all the elements in succession, and wherein, in a narrow field of view mode, the array is held stationary relative to the image, the elements are made to perform a time integration over a stare period substantially greater than the period between successive simultaneous shifts in the wide field of view mode, and the stored signals are then read out from all the elements.

2. A method according to claim 1, wherein the two-dimensional array is a staring focal plane array.

3. A method according to claim 1, further including the detection of a particular target when in the wide field of view mode, and consequently switching to the narrow field of view mode during which the target is tracked by continuous adjustment of the position of the image on the array so that the target image is not lost.

4. A method according to claim 3, wherein the tracking of the target is carried out by the same apparatus which causes the scanning movement in the wide field of view mode.

5. Imaging apparatus comprising a two dimensional array of elements operable selectively in a wide or a narrow field of view mode, each element storing an electrical signal representative of the time-integrated intensity of the light incident on it, scanning means for causing the array to scan swaths of an object along respective columns of the array, drive means for the array, and means responsive to the output of the array to provide an image of the scanned object, wherein, in the wide field of view mode of operation, the scanning means causes the array to scan the object, and the drive means periodically shifts the stored electrical signals simultaneously in the direction of the scan from each element to its neighbour for continued time-integration, and provides, at the output of the array, the stored electrical signal from the end element of each column of the array, the average speed at which the signals progress along the array being equal to the speed of the image scan whereby smearing of the image is minimised, and each successive output signal of a column being representative of the intensity of radiation from a different portion of the object time-integrated by all the elements in succession, and wherein, in the narrow field of view mode, the scanning means ceases the regular scan of the image and the drive means causes the elements to perform a time-integration over a stare period substantially greater than the period between successive simultaneous shifts in the wide field of view mode, and causes the stored signals then to be read-out from all the elements.

6. Imaging apparatus according to claim 5, comprising: target detection means responsive to the output of the array to determine the presence or absence of a target and to set the mode of operation of the array to the wide or the narrow field of view mode in accordance with that determination.

7. Imaging apparatus according to claim 5, comprising: target tracking means operable in the narrow field of view mode to provide target co-ordinates to the scanning means to cause the scanning means to follow the target if the target moves relative to the remainder of the object, the scanning means otherwise holding the image stationary relative to the array.

8. Imaging apparatus according to claim 7, wherein the two-dimensional array is a staring focal plane array.

9. Imaging apparatus according to claim 5, wherein the array is a CCD array.

10. Imaging apparatus according to claim 9, in which the array is an IRCCD array.

11. Imaging apparatus according to claim 5, in which the scanning means comprises a mirror driven by a motor.

12. Imaging apparatus according to claim 11, wherein the scanning means operates in the wide field of view mode to rotate the mirror such as to cause the regular scanning of the image, and alternatively in the narrow field of view mode to move the same mirror intermittently such as to follow the target.

* * * * *